(12) United States Patent
Wong

(10) Patent No.: US 9,104,725 B2
(45) Date of Patent: Aug. 11, 2015

(54) AUTOMATIC TUNING OF DATABASE QUERIES

(71) Applicant: Joseph Wong, Vancouver (CA)

(72) Inventor: Joseph Wong, Vancouver (CA)

(73) Assignee: SAP SE, Walldorf (DE)

( * ) Notice: Subject to any disclaimer, the term of this patent is extended or adjusted under 35 U.S.C. 154(b) by 171 days.

(21) Appl. No.: 13/721,433

(22) Filed: Dec. 20, 2012

(65) Prior Publication Data

US 2014/0181072 A1     Jun. 26, 2014

(51) Int. Cl.
    *G06F 7/00*             (2006.01)
    *G06F 17/30*           (2006.01)

(52) U.S. Cl.
    CPC .... *G06F 17/30442* (2013.01); *G06F 17/30451* (2013.01); *G06F 17/30457* (2013.01)

(58) Field of Classification Search
    CPC .................. G06F 17/30442; G06F 17/30451; G06F 17/30457
    USPC ........................................................ 707/741
    See application file for complete search history.

(56) References Cited

U.S. PATENT DOCUMENTS

| | | | |
|---|---|---|---|
| 7,895,189 B2 * | 2/2011 | Balmin et al. ................ | 707/741 |
| 2013/0086039 A1 * | 4/2013 | Salch et al. .................... | 707/717 |
| 2014/0181073 A1 | 6/2014 | Wong | |
| 2014/0188841 A1 * | 7/2014 | Sun et al. ...................... | 707/718 |

OTHER PUBLICATIONS

"Join (SQL)", [Online]. Retrieved from the Internet: <URL: http://en.wikipedia.org/w/index.php?oldid=529944245>, (Accessed Dec. 31, 2012), 16 pgs.

"MYSQL 5.0 Reference Manual: 8.3.1 Outer Join Simplification", © 2012, Oracle Corporation and/or its affiliates, [Online]. Retrieved from the Internet: <URL: http://dev.mysql.com/doc/refman/5.0/en/outer-join-simplification.html>, (Accessed Dec. 21, 2012), 4 pgs.

"Select (SQL)", [Online]. Retrieved from the Internet: <URL: http://en.wikipedia.org/w/index.php?oldid=529942828>, (Accessed Dec. 31, 2012), 6 pgs.

Chamberlin, Donald D, et al., "SQL", [Online]. Retrieved from the Internet: <URL: http://en.wikipedia.org/w/index.php?oldid=523499964 >, (Accessed Nov. 20, 2012), 16 pgs.

Factor, Phil, "Temporary Tables in SQL Server", [Online]. Retrieved from the Internet: <URL: http://www.simple-talk.com/content/print.aspx?article=1349>, (Sep. 1, 2011), 7 pgs.

Jones, Joel, "Abstract Syntax Tree Implementation Idioms", Proceedings of the 10th Conference on Pattern Languages of Programs PLoP2003 (2003), [Online]. Retrieved from the Internet: <URL: http://web.archive.org/web/20120406111308/http:/www.hillside.net/plop/plop2003/Papers/Jones-ImplementingASTs.pdf>, (2003), 10 pgs.

Kliebhan, Fabian, "A Truly Compositional SQL Compiler", (Sep. 4, 2009), 28 pgs.

* cited by examiner

*Primary Examiner* — Neveen Abel Jalil
*Assistant Examiner* — Kilpatrick L Jones
(74) *Attorney, Agent, or Firm* — Schwegman Lundberg & Woessner, P.A.

(57) ABSTRACT

A database query is modified to improve performance by identifying portions of database tables that are likely to be reused and modifying the database query accordingly. According to certain embodiments, the degree of selectivity with which a table is accessed is used to identify tables that are likely to be reused in subsequent database operations.

24 Claims, 22 Drawing Sheets a:{id,name,b_id} | b:{id, gender, c_id} | c:{id, gender} ← 104

SELECT *
FROM ((a INNER JOIN b ON a.b_id = b.id)
    INNER JOIN c ON b.c_id = c.id)) ← 102
WHERE ( a.name IS NOT NULL AND a.id = 13)

FIG. 1 a:{id,name,b_id} | b:{id, gender, c_id} | c:{id, gender}  ← 404

SELECT *  ← 402
FROM ((a INNER JOIN b ON a.b_id = b.id)
      INNER JOIN c ON b.gender = c.gender))
WHERE ( a.name IS NOT NULL AND a.id = 13)

FIG. 4

E:{id, name,EP_id} | EP:{id,C_id, region} | C:{id,city_name,region}  ← 704

← 702

SELECT *
FROM ((E INNER JOIN EP ON E.EP_id = EP.id)
    INNER JOIN C ON EP.region = C.region))
WHERE ( E.name IS NOT NULL AND E.id = 42)

FIG. 7

E:{id, name,EP_id} | EP:{id,C_id, region, firm} | C:{id,city_name,region}

← 1004

EP -> (SELECT * FROM EP WHERE EP.firm= 'ACME')   ←— 1006

SELECT *                                         ←— 1002
FROM ((E INNER JOIN EP ON E.EP_id = EP.id)
    INNER JOIN C ON EP.region = C.region))
WHERE ( E.name IS NOT NULL AND E.id = 42)

FIG. 10

E:{id, name,EP_id} | EP:{id,C_id, region, firm} | C:{id,city_name,region}  ← 1004

SELECT *
FROM ((E INNER JOIN
        (SELECT * FROM EP WHERE EP.firm = 'ACME') ON E.EP_id = EP.id)
        INNER JOIN C ON EP.region = C.region)
WHERE ( E.name IS NOT NULL AND E.id = 42)   ← 1102

FIG. 11

E:{id, name,Ep_id} | EP:{id,C_id, region, firm} | C:{id,city_name,region} |

ACL{sharer_ep_id, recip_ep_id}

SELECT *
FROM ((E INNER JOIN EP ON E.EP_id = EP.id)
      INNER JOIN C  ON EP.region = C.region))
WHERE ( E.name IS NOT NULL AND E.id = 42)

FIG. 13

EP HS = FALSE

Replace EP -> SELECT * FROM
EP LEFT OUTER JOIN (SELECT DISTINCT * FROM ACL WHERE recip_ep_id = 7) ON
EP.id = ACL.sharer_ep_id WHERE
EP.firm = 'ACME' OR ACL.sharer_ep_id IS NOT NULL

FIG. 15

EP HS = True

Replace EP -> SELECT * FROM EP
WHERE EP.firm ='ACME'
OR EP.id IN (SELECT sharer_ep_id
FROM ACL
WHERE recip_ep_id = 7)

FIG. 17

EP HS = FALSE

SELECT *
FROM ((E INNER JOIN (SELECT * FROM EP LEFT OUTER JOIN (SELECT DISTINCT *     FROM
ACL WHERE recip_ep_id = 7) ON EP.id = ACL.sharer_ep_id WHERE   EP.firm ='SAP AG' OR
ACL.sharer_ep_id IS NOT NULL) ON E.EP_id = EP.id)              INNER JOIN  C  ON EP.region =
C.region)
WHERE ( E.name IS NOT NULL AND E.id = 42)

— 1902

EP HS = TRUE

SELECT *
FROM ((E INNER JOIN (SELECT * FROM EP WHERE EP.firm ='SAP AG'  OR EP.id IN
                    (SELECT sharer_ep_id FROM ACL WHERE recip_ep_id = 7)) ON E.EP_id = EP.id) INNER
JOIN C   ON EP.region = C.region)
WHERE ( E.name IS NOT NULL AND E.id = 42)

AUTOMATIC TUNING OF DATABASE QUERIES

FIELD

The present disclosure relates generally to computing and more particularly to database systems.

BACKGROUND

As database queries become increasingly complex, execution costs have also increased, for example, as measured by processing time. Some queries include complex sub-queries that are optimized by some but not all databases. These sub-queries may define overlapping portions of database tables and optimization may include reuse of results for these overlapping portions.

BRIEF DESCRIPTION OF DRAWINGS

Some embodiments are illustrated by way of example and not limitation in the figures of the accompanying drawings.

FIG. 1 is a code listing that shows a database query and related tables for an example embodiment.

FIG. 4 is a code listing that shows a database query and related tables for another example embodiment.

FIG. 7 is a code listing that shows a database query and related tables for another example embodiment.

FIG. 10 is a code listing that shows a database query and related tables for an example embodiment that includes a modification of the database query of FIG. 7.

FIG. 11 is a code listing that shows a database query and related tables for the embodiment of FIG. 10.

FIG. 13 is code listing that shows a database query and related tables for an example embodiment that includes another modification of the database query of FIG. 7.

FIG. 15 is a code listing that shows an access-control sub-query that replaces a highly selective source node for the embodiment of FIG. 14.

FIG. 17 is a code listing that shows an access-control sub-query that replaces as non-highly selective source node for the embodiment of FIG. 14.

FIG. 19 is a code listing that shows an access-control query corresponding to a source node that is highly selective and an access-control query corresponding to a source node that is not highly selective.

DETAILED DESCRIPTION

Example methods and systems are directed to database queries and related technology. The disclosed examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

FIG. 1 shows a database query 102 and related tables 104 for an example embodiment. Three tables, a, b, and c, are shown with column identifiers including id, b_id, c_id, name, and gender. The column identifier id is used as a primary key (e.g., a unique row identifier), the column identifiers b_id, and c_id are used as foreign keys (e.g., for accessing rows of other tables), and the column identifiers name, and gender are used as data field names (e.g., data characteristics of a row).

Figure 2:
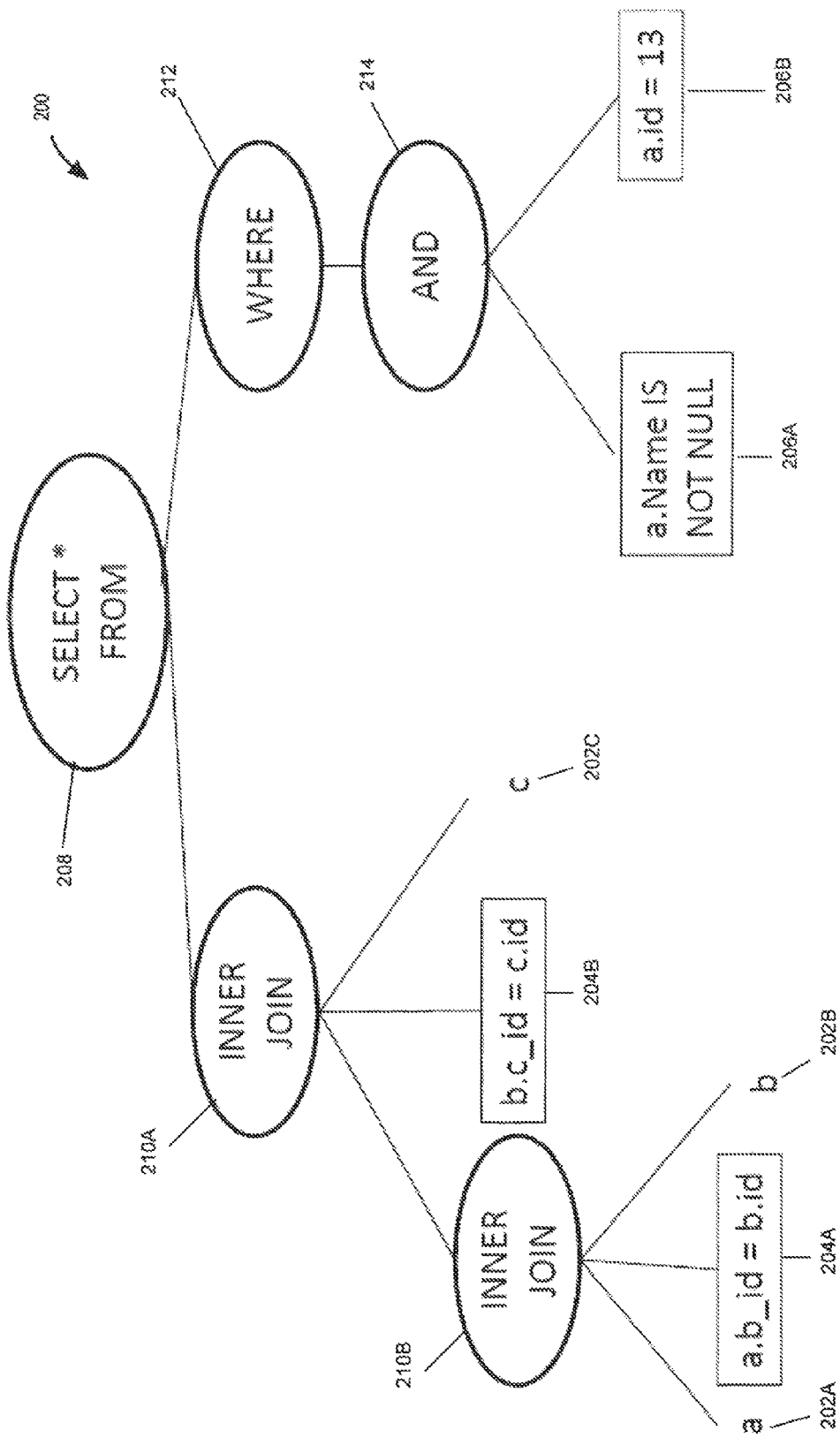
FIG. 2 is a diagram that shows a hierarchical tree that corresponds to the database query of FIG. 1.

As is well known in the art, an equivalent hierarchical tree can be used to represent a database query. FIG. 2 shows a hierarchical tree 200 that corresponds to the database query of FIG. 1. The tree 200 includes source nodes 202A, 202B, 202C that correspond to the tables a, b, c, condition nodes 204A, 204B that correspond to conditions for join clauses, and condition nodes 206A, 206B that correspond to a query condition for the database query conditions for a where clause). Note that depending on the operational setting, conditions may be alternatively described as predicates or constraints (e.g., with corresponding predicate nodes or constraint nodes). The tree 200 also includes a selection node 208 (e.g., as a top node) that corresponds to the select statement of the query, join nodes 210A, 210B that correspond to two inner joins, a where-clause node 212 that corresponds to a to the query condition, and an and-condition node 214 that combines the two conditions 206A, 206B related to the query condition.

Next the source nodes 202 (or corresponding tables) can be classified as highly selective or not highly selective by examining the tree 200 (e.g., in a depth-first search) to determine whether or not a source node satisfies a selectivity criterion that corresponds to how selectively corresponding tables are accessed by the database query (e.g., through a relatively small number of rows). In other words, to be highly selective the values in the column are typically such that a query for a given value returns a low number of rows relative to the total number of rows in the table. Examples of columns likely to be labeled highly selective include primary key, name of person, ID number, or the like. Examples of columns likely to be labeled as not highly selective include gender, Boolean, or the like. In yet other words, the high selectivity condition places a limit on a number of rows a query accesses in a corresponding table For this embodiment, the following criteria for high selectivity are used:

1. As a default, a source node is labeled as not highly selective (HS=F).

2. A source node is labeled as highly selective (HS=T) if a query condition (e.g., where-clause constraint) identifies a relatively small number of rows in the corresponding table (e.g., relatively small compared to the total number of rows in the table).

3. High selectivity of source nodes is propagated through chains of joins in the tree 200. If the left-hand side (LHS) of a join condition identifies a table that is highly selective and the right-hand side (RHS) of the join condition includes key-like columns in the RHS, then the high selectivity of the LHS is propagated to the RHS so that the source node for the RHS is labeled as highly selective (HS=T). (Note that key-like columns are understood to be identifying keys, such as primary keys or composite keys.)

Figure 3:
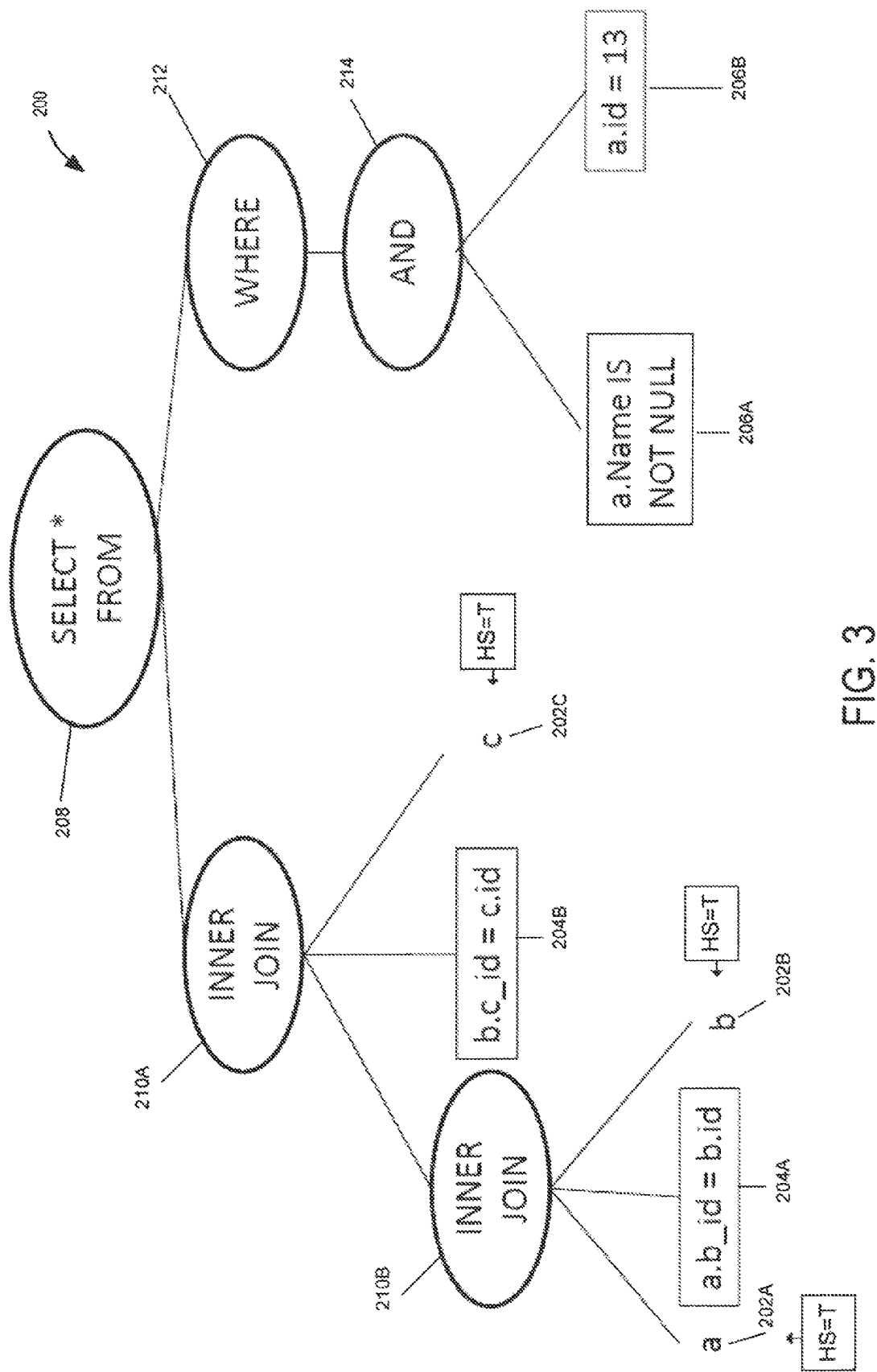
FIG. 3 is a diagram that shows the hierarchical tree of FIG. 2 with labels to indicate that a source node (or corresponding table) is highly selective (HS=T) for not highly selective (HS=F).

FIG. 3 shows the hierarchical tree of FIG. 2 with labels to indicate that a source node (or corresponding table) is highly selective (HS=T) for not highly selective (HS=F). First, the source node 202A for table a is labeled as highly selective (HS=T) because the condition 205B identifies a single column through the primary key id. Next, the source node 202B for table b is labeled as highly selective (HS=T) because source node 202A for table a is labeled as highly selective and the join condition 204A includes key-like columns for table b (e.g., through primary key id). Next the source node 202C for table c is labeled as highly selective (HS=T) because source node 202B for table b is labeled as highly selective and the join condition 204B includes key-like columns for table c (e.g., through primary key id).

FIG. 4 shows another database query 402 and related tables 404 for an example embodiment. Similarly as in FIG. 1, three tables, a, b, and c, are shown with column identifiers including id, b_id, c_id, name and gender. The column identifier id is used as a primary key (e.g., a unique row identifier), the column identifiers b_id and c_id are used as foreign keys (e.g., for accessing rows of other tables), and the column identifiers name, and gender are used as data field names (e.g., data characteristics of a row). As compared with FIG. 1, the inner join condition that relates tables b and c has been changed from "b.c_id=c.id" to "b.gender=c.gender."

Figure 5:
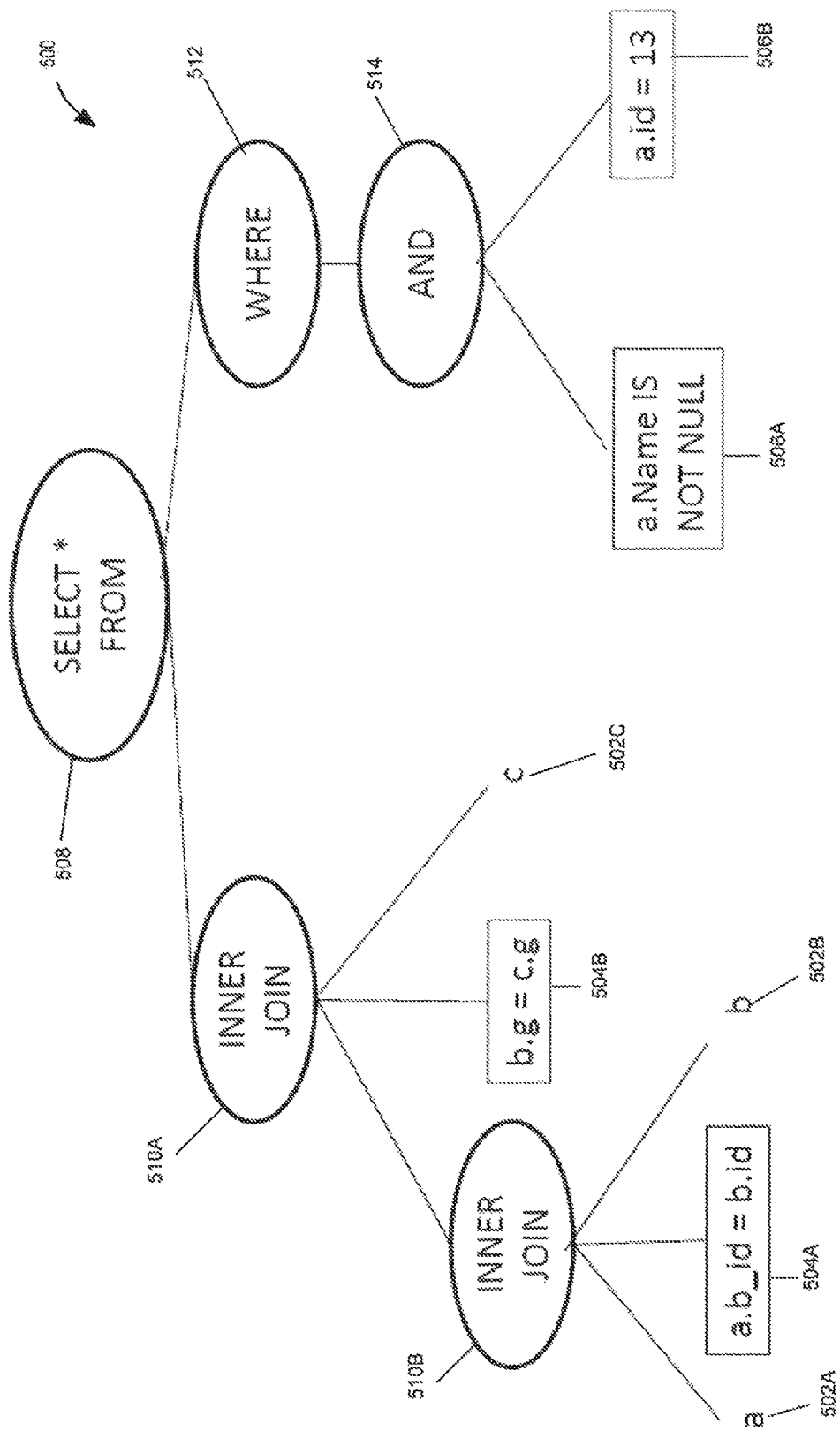
FIG. 5 is a diagram that shows a hierarchical tree that corresponds to the database query of FIG. 4.

Similarly as in FIG. 2, FIG. 5 shows a hierarchical tree 500 that corresponds to the database query of FIG. 4. The tree 500 includes source nodes 502A, 502B, 502C that correspond to the tables a, b, c, condition nodes 504A, 504B that correspond to conditions for join clauses, and condition nodes 506A, 506B that correspond to a query condition for the database query. The tree 500 also includes a top node 508 that corresponds to the select statement of the query, join nodes 510A, 510B that correspond to two inner joins, a where-clause node 512 that corresponds to a to the query condition, and an and-condition node 514 that combines the two conditions 506A, 506B related to the query condition. Next the source nodes 502 (or corresponding tables) can be classified as highly selective or not highly selective by examining the tree 500 (e.g., in a depth-first search) to determine whether or not a source node satisfies a selectivity criterion that corresponds to how selectively corresponding tables are accessed by the database query (e.g., through a relatively small number of rows).

Figure 6:
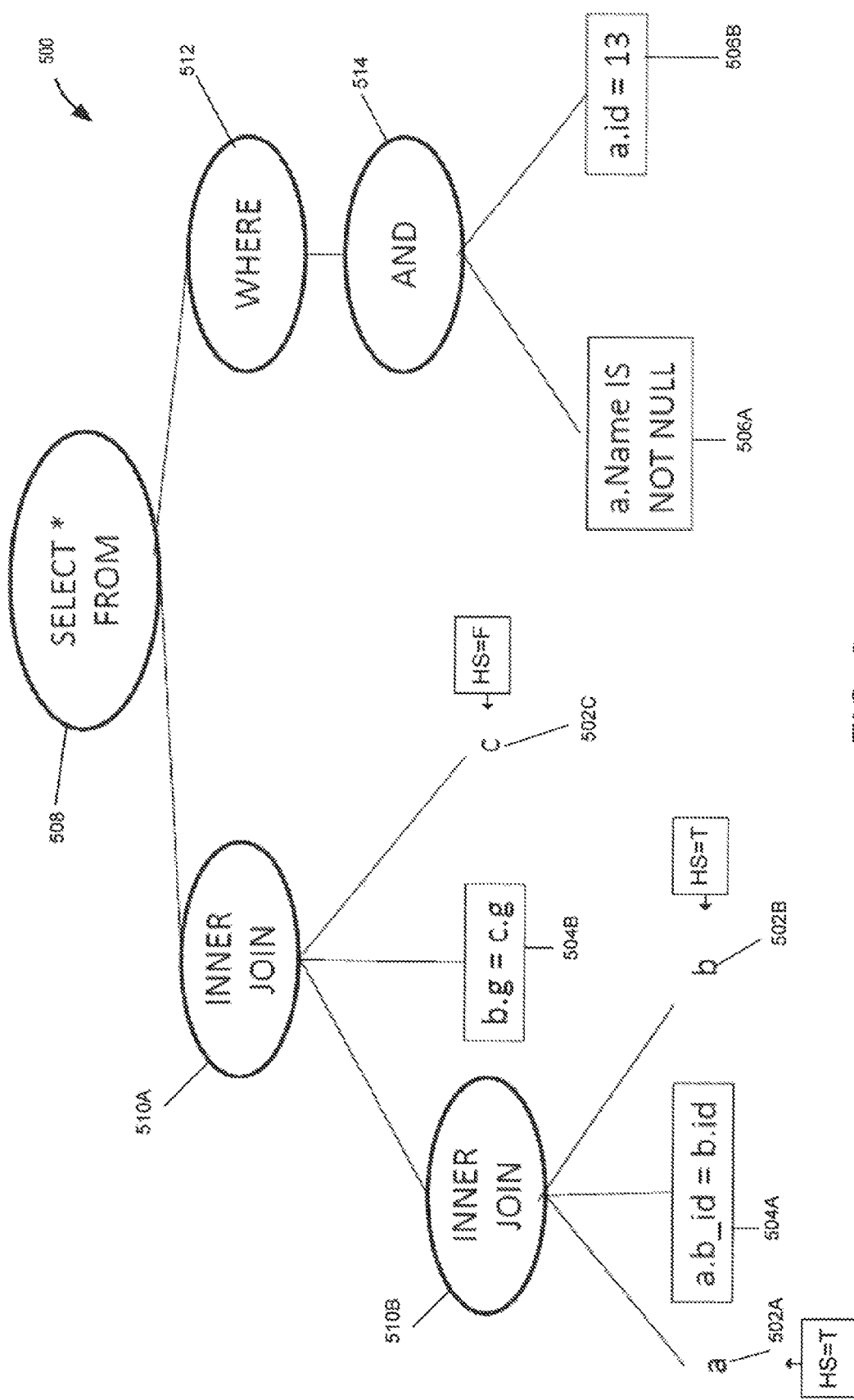
FIG. 6 is a diagram that shows the hierarchical tree of FIG. 5 with labels to indicate that a source node (or corresponding table) is highly selective (HS=T) for not highly selective (HS=F).

Similarly as in FIG. 3, FIG. 6 shows the hierarchical tree of FIG. 5 with labels to indicate that a source node (or corresponding table) is highly selective (HS=T) for not highly selective (HS=F). First, the source node 502A for table a is labeled as highly selective (HS=T) because the condition 506B identifies a single column through the primary key id. Next, the source node 502B for table b is labeled as highly selective (HS=T) because source node 502A for table a is labeled as highly selective and the join condition 504A includes key-like columns for table b (e.g., through primary key id). Next, in contrast with FIG. 3, the source node 502C for table c is labeled as not highly selective (HS=F) because, although source node 502B for table b is labeled as highly selective, the join condition 504B does not include key-like columns for table c. That is, the condition "b.gender=c.gender," which is abbreviated as "b.g=c.g" at join condition node 504B, employs the data field identifier gender and not an identifying key as in FIG. 3.

FIG. 7 shows another database query 702 and related tables 704 for an example embodiment. In this embodiment, three tables, E, EP, and C, are shown with reference to employees, employee profiles, and cities respectively, and the column identifiers include id, name, EP_id, C_id, region, and city_name. The column identifier id is used as a primary key (e.g., a unique row identifier), the column identifiers EP_id, and C_id are used as foreign keys (e.g., for accessing rows of other tables), and the column identifiers name, region, and city_name are used as data field names (e.g., data characteristics of a row).

Figure 8:
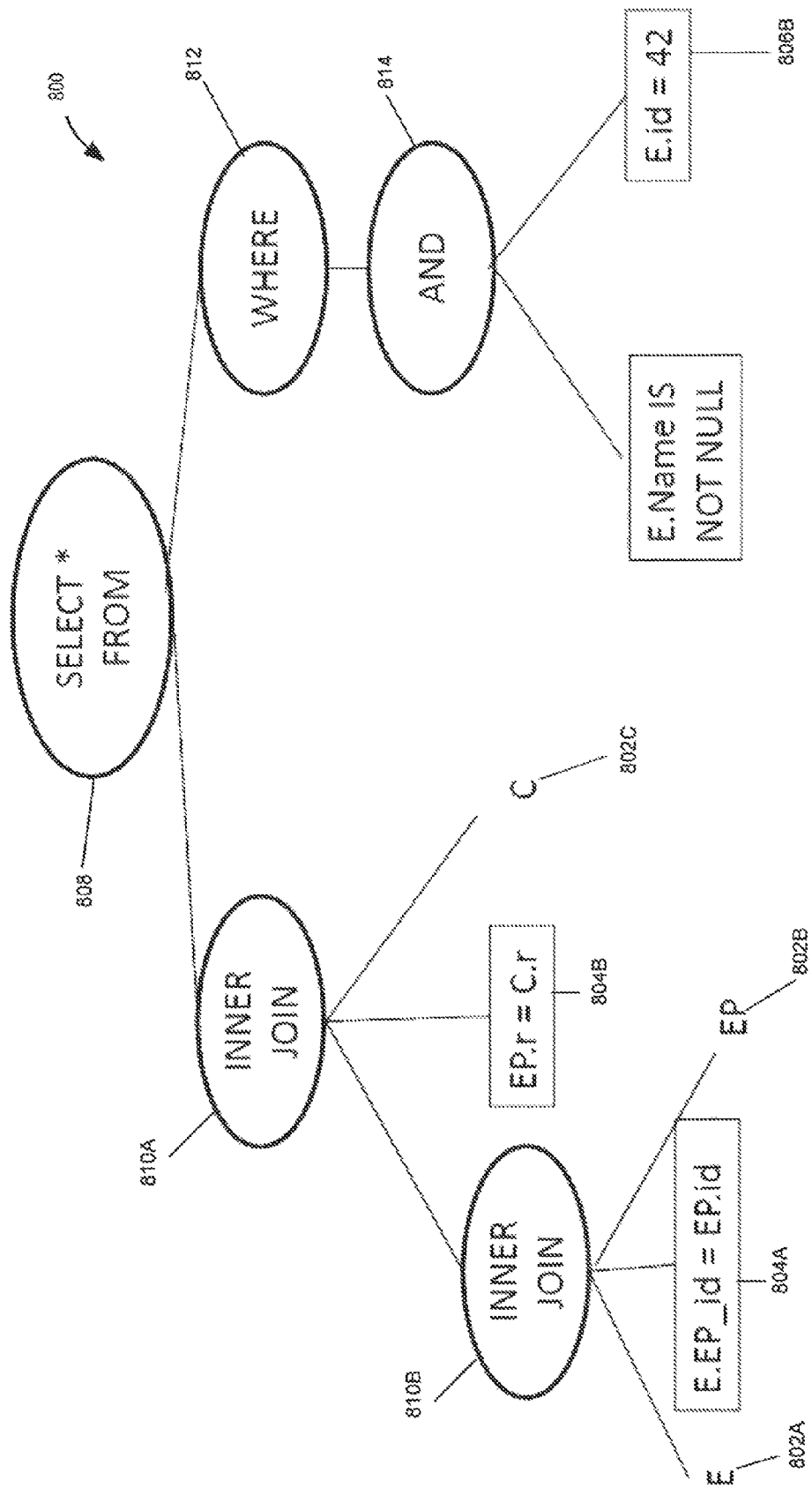
FIG. 8 is a diagram that shows a hierarchical tree that corresponds to the database query of FIG. 7.

Similarly as in FIGS. 2 and 5, FIG. 8 shows a hierarchical tree 800 that corresponds to the database query of FIG. 7. The tree 800 includes source nodes 802A, 802B, 802C that correspond to the tables E, EP, C, condition nodes 804A, 804B that correspond to conditions for join clauses, and condition nodes 806A, 806B that correspond to a query condition for the database query. The tree 800 also includes a top node 808 that corresponds to the select statement of the query, join nodes 810A, 810B that correspond to two inner joins, a where-clause node 812 that corresponds to a to the query condition, and an and-condition node 814 that combines the two conditions 806A, 806B related to the query condition. Next the source nodes 802 (or corresponding tables) can be classified as highly selective or not highly selective by examining the tree 800 (e.g., in a depth-first search) to determine whether or not a source node satisfies a selectivity criterion that corresponds to how selectively corresponding tables are accessed by the database query (e.g., through a relatively small number of rows).

Figure 9:
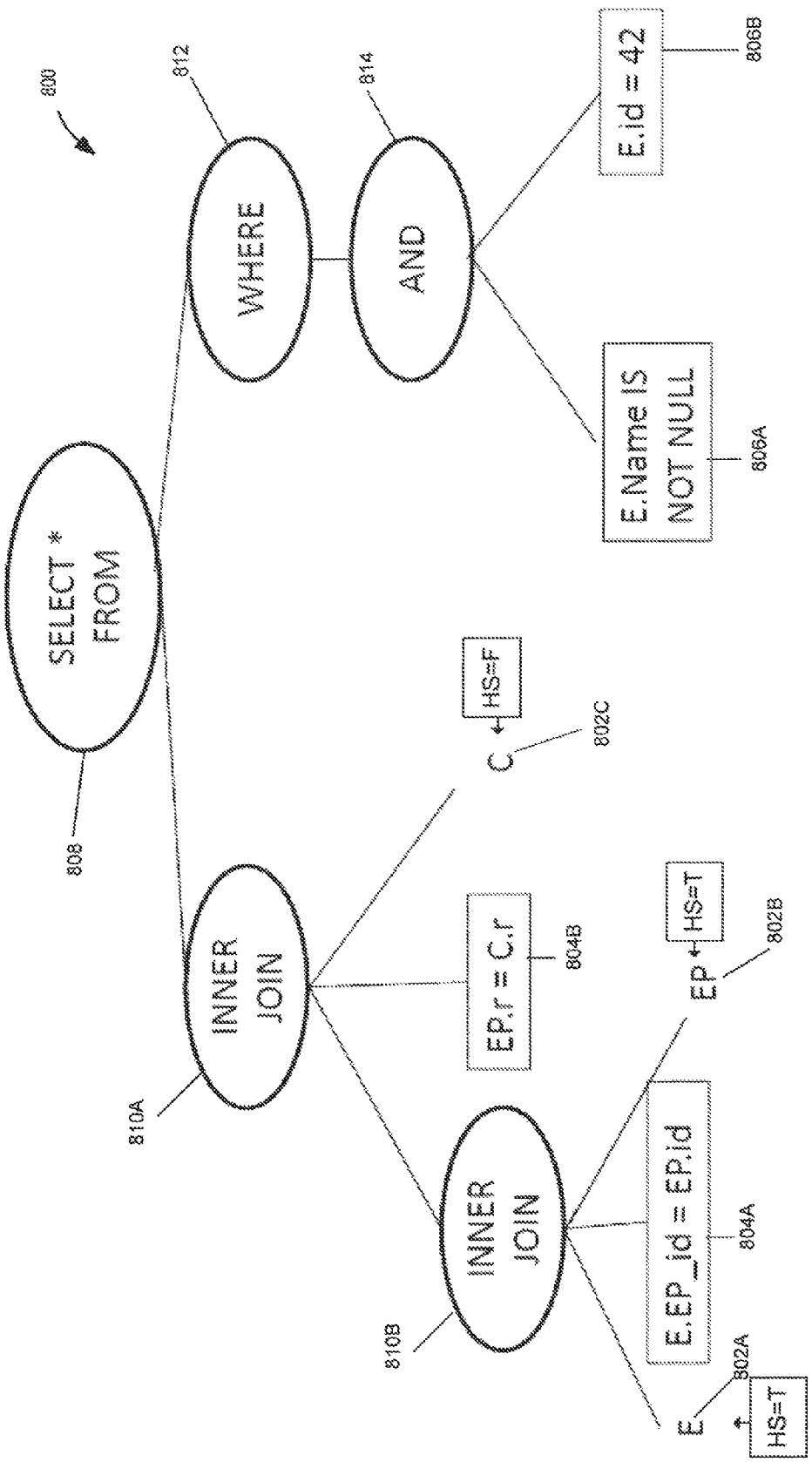
FIG. 9 is a diagram that shows the hierarchical tree of FIG. 8 with labels to indicate that a source node (or corresponding table) is highly selective (HS=T) for not highly selective (HS=F).

Similarly as in FIGS. 3 and 6, FIG. 9 shows the hierarchical tree of FIG. 8 with labels to indicate that a source node (or corresponding table) is highly selective (HS=T) for not highly selective (HS=F). First, the source node 802A for table E is labeled as highly selective (HS=T) because the condition 806B identifies a single column through the primary key id. Next, the source node 802B for table EP is labeled as highly selective (HS=T) because source node 802A for table E is labeled as highly selective and the join condition 804A includes key-like columns for table EP (e.g., a through primary key id). Next, similarly as in FIG. 6, the source node 802C for table C is labeled as not highly selective (HS=F) because, although source node 802B for table EP is labeled as highly selective, the join condition 804B does not include key-like columns for table C. That is, the condition "EP.region=C.region," which is abbreviated as "EP.r=C.r" at join-condition node 804B, employs the data field identifier region and not an identifying key.

FIG. 10 shows a database query 1002 and related tables 1004 that include a modification of the embodiment of FIG. 7. In this embodiment, the table EP now includes an additional column identifier firm, which may refer to a firm (e.g., business entity) whose data has access restricted to members of that firm. FIG. 10 shows that the database query of FIG. 7 can be restricted to employee profile data in table EP by identifying a specific firm (e.g., ACME) through a selection operation in a sub-query 1006. FIG. 11 shows the resulting database query 1102 where the firm selection operation has been expressed as a sub-query in the original query.

Figure 12:
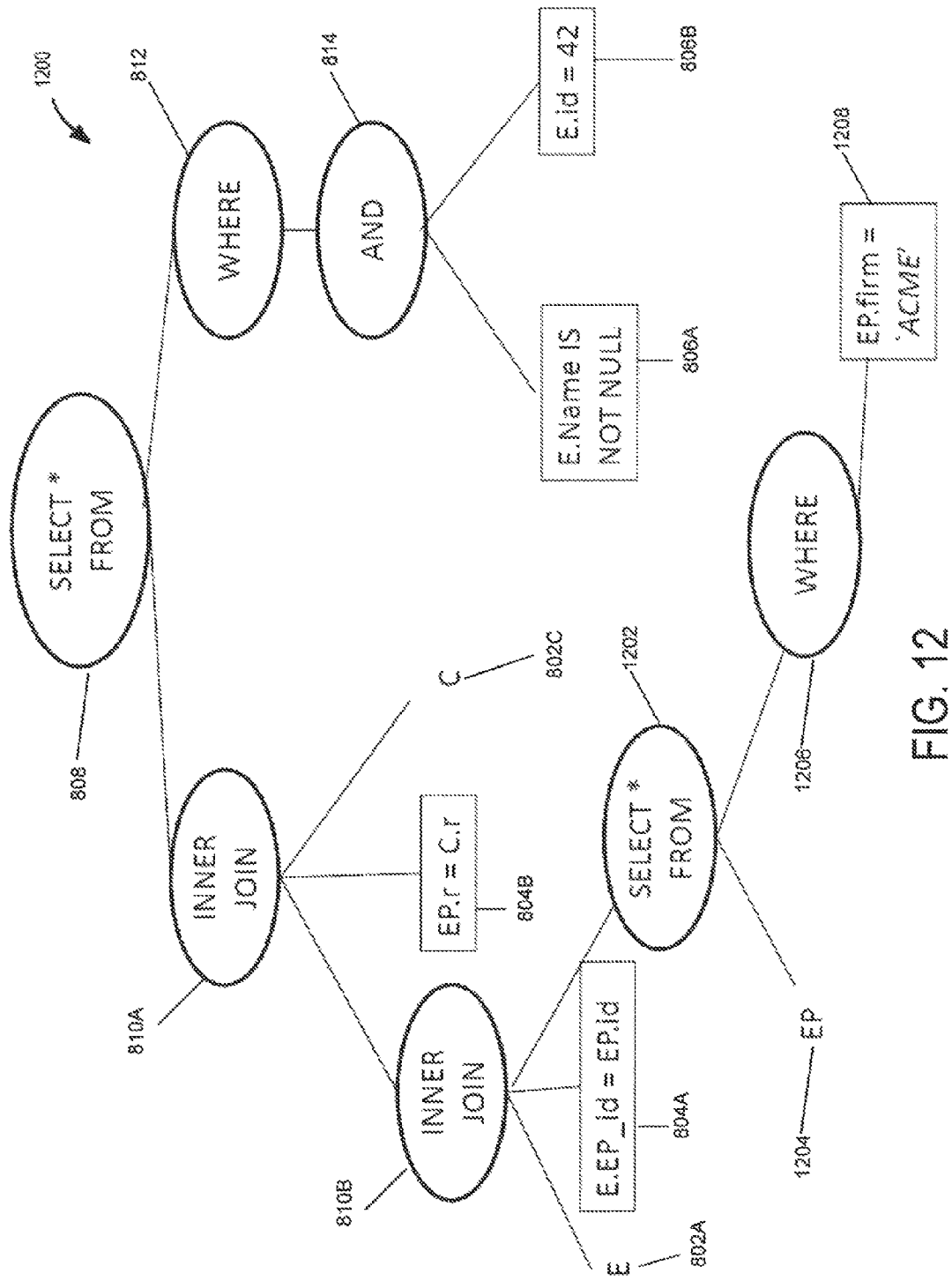
FIG. 12 is a diagram that shows a hierarchical tree that corresponds to the database query of FIG. 11.

FIG. 12 shows a hierarchical tree 1200 that corresponds to the database query of FIG. 11. The hierarchical tree 1200 can be understood as a modification of the hierarchical tree of FIG. 9 where the source node 802B for table EP has been replaced by a sub-tree corresponding to the sub-query 1006 including a selection node 1202, a source node 1204 for the table EP (including the firm column), a where-clause node 1206, and a condition node 1206 to identify the firm (e.g., ACME).

FIG. 13 shows a database query 1302 and related tables 1304 for an example embodiment that includes another modification of the database query of FIG. 7. An access control list (ACL) 1306 has been introduced to control access to the table values based on the identifications from the employee profile (EP) table. In this embodiment, sharer_ep_id is identifier for the employee whose profile is being shared, and recip_ep_id is the identifier for the employee who receives the shared profile (e.g., a user who executes the query). In many operational settings, data for a firm (e.g., ACME) may be stored in a database that includes many firms, and so access to each firm's data must be restricted (e.g., to employees or specific employees).

Figure 14:
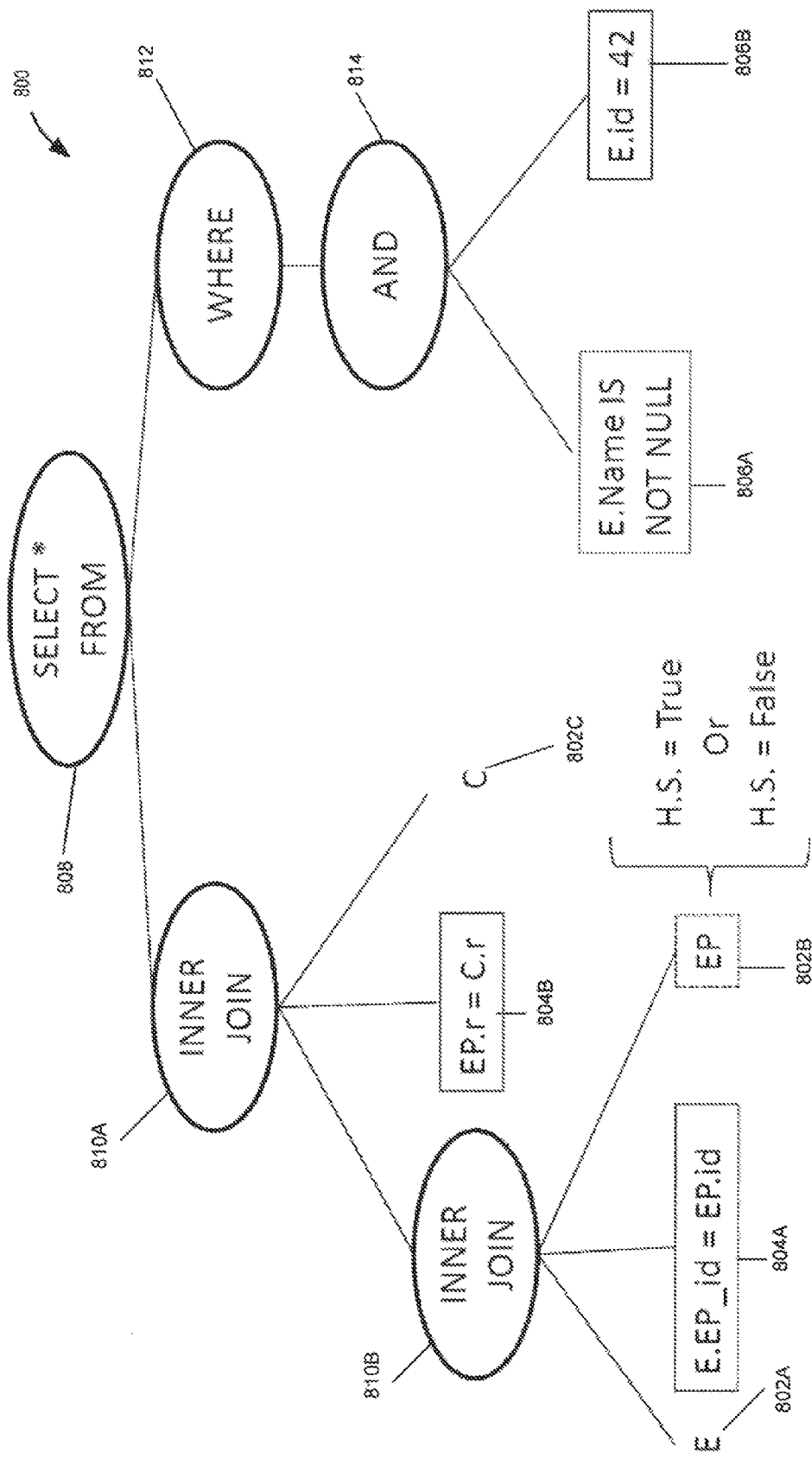
FIG. 14 is a diagram that shows a hierarchical tree that corresponds to the database query of FIG. 13 for different degrees of selectivity for a source node.

FIG. 14 shows a hierarchical tree that corresponds to the database query of FIG. 13 for different degrees of selectivity for a source node. The hierarchical tree 800 FIG. 8, which corresponds to the database query of FIG. 7, is shown with an emphasis on the selectivity status of the source node 802B for the table EP (e.g., HS=True or HS=False). FIGS. 15-19 show related details for query modification for the source node 802B depending on the selectivity status. In this case recip_ep_id=7 identifies the employee who receives (e.g., accesses) the database information after being logged into the system. The difference between a node being highly selective and not highly selective may have an effect on a resulting optimization of a corresponding query. In some example embodiments related to access control this optimization is illustrated herein. A query that includes a source node may be desirably modified to improve performance in query execution depending on whether or not the source node is classified as highly selective. In many operational settings, high selectivity implies that the corresponding table is not likely to be reused and so there is no substantial reason to retain values, and low selectivity implies that the corresponding table is likely to be reused and so performance can be improved by retaining values (e.g., by caching). Thus, computational resources, such as time or space, can be better managed.

Figure 16:
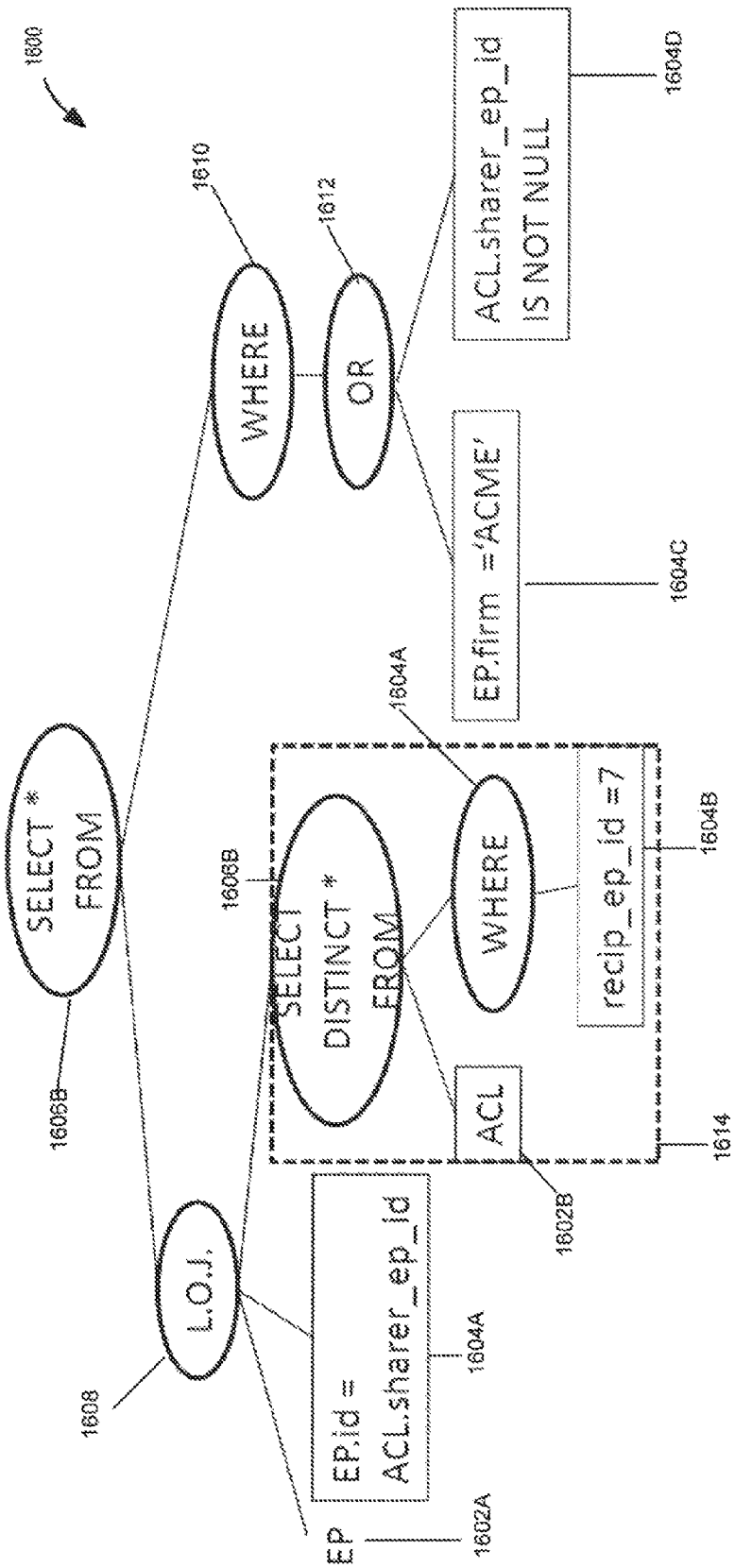
FIG. 16 is a diagram that shows a hierarchical tree that corresponds to the access-control sub-query of FIG. 15.

For the case where HS=False in FIG. 14, FIG. 15 shows the modification for the source node 802B as an access-control sub-query 1502 that replaces the source node 802B, and FIG. 16 shows the corresponding hierarchical tree 1600. The hierarchical tree 1600 includes source nodes 1602A, 1602B, condition nodes 1604A, 1604B, 1604C, 160D, Selection nodes 1606A, 1606B, a join node 1608 for a left outer join (LOJ), as where-clause node 1610, and an or-condition node 1612. A portion 1614 of the tree, enclosed by a dashed line, corresponds to a temporary table that is formed through the join operation (e.g., at join node 1608) in the execution of the query 800. Temporary tables, which may be accessible locally (e.g., to the user executing the query 800) or globally (e.g., to others logged into the system), are relatively expensive to create and so they are more desirable if reusable (e.g., by caching temporary tables). For example, when the source node is not highly selective, values from the temporary table are more likely to be re-used and so the relatively expensive overhead for creating the table is justified. That is, the absence of selectivity implies a higher chance of reuse.

Figure 18:
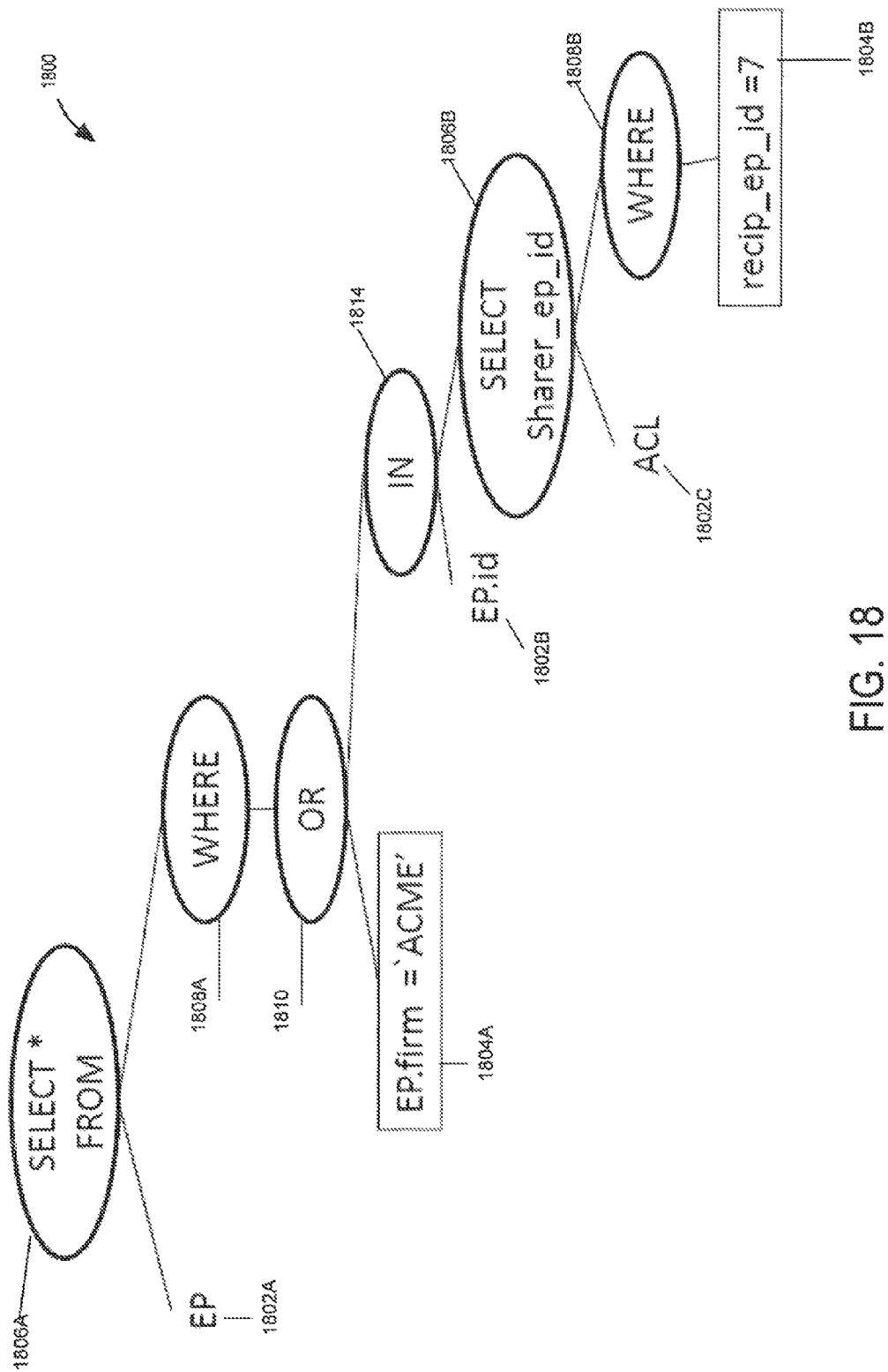
FIG. 18 is a diagram that shows a hierarchical tree that corresponds to the access-control sub-query of FIG. 17.

For the case where HS=True in FIG. 14, FIG. 17 shows the modification for the source node 802B as an access-control sub-query 1702 that replaces the source node 802B, and FIG. 18 shows the corresponding hierarchical tree 1800. The hierarchical tree 1800 includes source nodes 1802A, 1802B, 1802C condition nodes 1804A, 1804B, Selection nodes 1806A, 1806B, where-clause nodes 1808A, 1808B, an or-condition node 1810, and an in-condition node 1814. As compared with the hierarchical tree 1600 of FIG. 16, there is no join operation (e.g., at join node 1608) and no portion 1614 that corresponds to a temporary table.

Finally, FIG. 19 shows the corresponding access-control query 1902 when the source node 802B for table EP is not highly selective by substituting the hierarchical tree 1600 for the sub-query 1502 at the source node 802B in FIG. 14. Similarly, FIG. 19 shows the corresponding access-control query 1904 when the source node 802B for table EP is highly selective by substituting the hierarchical tree 1800 for the sub-query 1702 at the source node 802B in FIG. 14.

Figure 20:
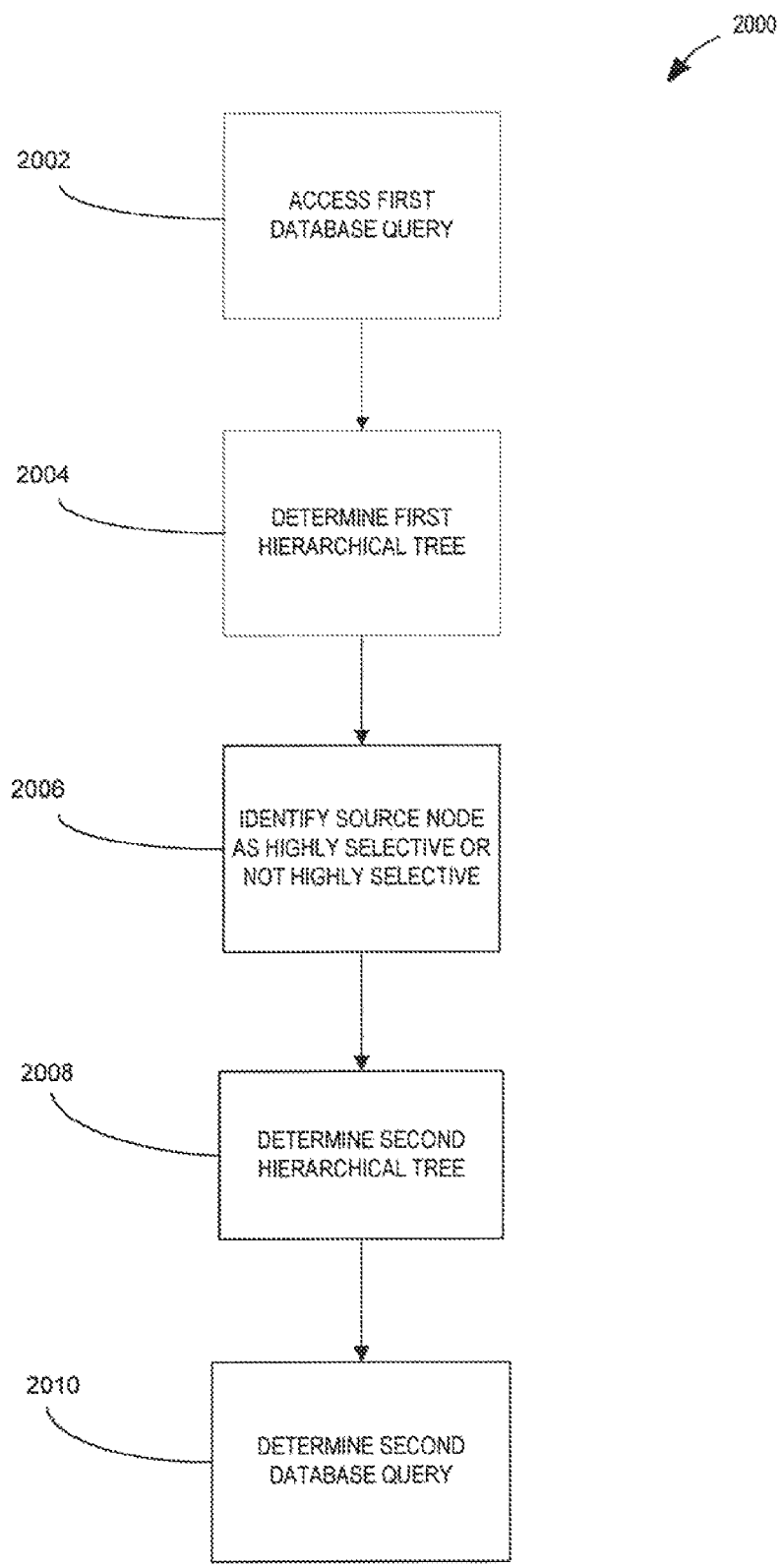
FIG. 20 is a flowchart that shows a method of optimizing a database query according to an example embodiment.

FIG. 20 shows a method of optimizing a database query according to an example embodiment (e.g., to improve execution performance). A first operation 2002 includes accessing a first database query (e.g., query 1306 in FIG. 13), the first database query including selection operations directed to one or more tables in a database. For example, the first database query may be accessed from storage in a non-transitory computer-readable medium.

A second operation 2004 includes determining a first hierarchical tree that corresponds to the first database query (e.g., hierarchical tree 800 in FIG. 14), the first hierarchical tree including at least one source node for each of the one or more tables in the first database query (e.g., source node 802B in FIG. 14). The mapping between a database query and a hierarchical tree is well known in the art (e.g., FIGS. 13 and 14). Typically the first hierarchical tree includes additional nodes corresponding to the elements of the database query including, for example, selectivity nodes that correspond to selectivity operations directed to the one or more tables.

A third operation 2006 includes identifying a source node of the first hierarchical tree as highly selective if a selectivity condition is satisfied by a corresponding fable for the source node or as not highly selective if the selectivity condition is not satisfied by the corresponding table for the source node, the selectivity condition corresponding to a limit on a number of rows accessed in the corresponding table (e.g., source node 802B in FIG. 14). The identification of source nodes can be carried out by standard tree-walking algorithms (e.g., depth-first search) combined with a functional evaluation of the selectivity condition at each source node.

For example, according to one embodiment the selectivity condition is satisfied if the number of rows accessed for the corresponding table is less than a threshold number of rows. In addition for this embodiment, the selectivity condition is satisfied if the corresponding table is accessed through an identifying key (e.g., a primary key or a composite key) of the corresponding table in combination with another table that corresponds to a highly selective source node. For example, the combining relationship may be at join operation so that the selectivity condition is satisfied if the corresponding table is accessed through an identifying key of the corresponding table in a join operation with another table that corresponds to a highly selective source node.

A fourth operation 2008 includes determining a second hierarchical tree from the first hierarchical tree by replacing the source node with a sub-tree that corresponds to a filtered selection of the corresponding table from a larger table in the database, the sub-tree including an intermediate table that characterizes the filtered selection from the larger table if the source node is identified as not highly selective (e.g. FIGS. 15 and 16), and the sub-tree not including an intermediate table that characterizes the filtered selection from the larger table if the corresponding source node is identified as highly selective (e.g. FIGS. 17 and 18). The intermediate table may be as temporary table that is formed in the processing of the query where the temporary table that is either accessible locally (e.g., just to a user executing the query) globally (e.g., to a larger group of users). For example, a temporary table may be materialized in a spool space for the execution of the database query. The filtered selection of the corresponding, table may be determined from the larger table by selecting one or more values of a data-access key that identities rows of the larger table based on an access condition that restricts access to values of the larger table. For example, the filtered selection of the corresponding table from the larger table may implement an access control list that restricts access to the larger table based on a user identification associated with an execution of the second database query (e.g., employee no. 7 in access-control sub-query 1502 of FIG. 15).

As discussed above, temporary tables typically have a relatively high setup cost with respect to execution times but a relatively low use cost. Alternatively, maintaining the original query structure for an access control list requires no additional setup cost but a relatively high use cost, for example, as compared with reusing a cached temporary table. As shown in FIG. 16 in an application to access control, a temporary table (e.g., portion 1614) may arise when an access control list is implemented by modifying the query to include a join operation (e.g., join node 1608).

A fifth operation 2010 includes determining a second database query that corresponds to the second hierarchical tree (e.g., FIG. 18). As discussed above, the mapping between a database query and a hierarchical tree is well known in the art. The database query can then be provided to the database for execution. The method may further include performing an execution of the second database query in the database, the execution including a caching operation on the intermediate table if the source node is identified as not highly selective.

At least some values for the results of the method can be output to a use or saved for subsequent use. For example the second database query ran be saved directly for subsequent execution. Alternatively, some derivative or summary form of the results (e.g., first and second hierarchical trees) can be saved for later use according to the requirements of the operational setting. It should be noted that words such as first and second are used here and elsewhere for labeling purposes only and are not intended to denote any specific spatial or temporal ordering. Furthermore, the labeling of a first element does not imply the presence a second element.

Figure 21:
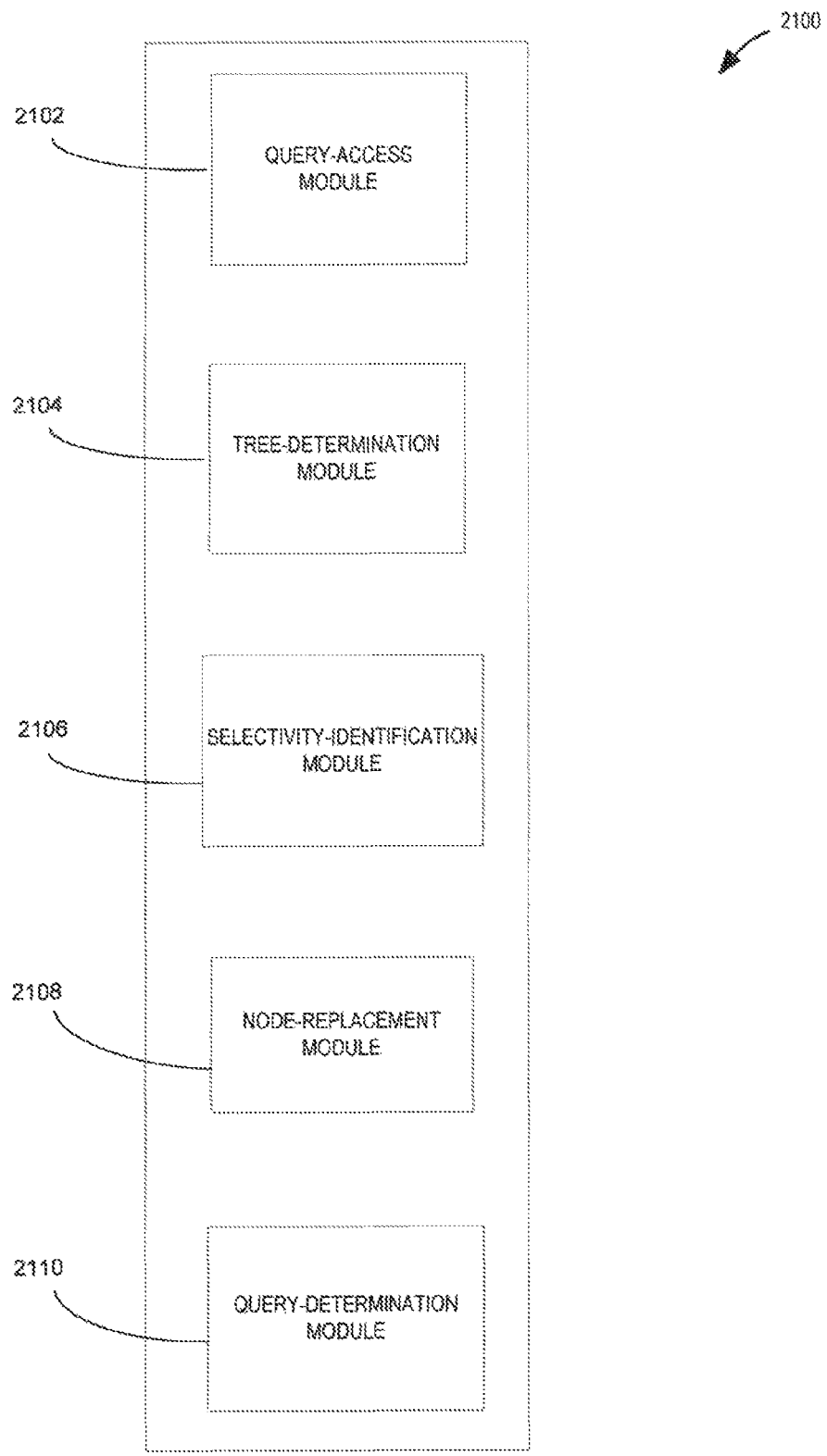
FIG. 21 is a block diagram that shows a schematic representation of an apparatus for an example embodiment.

Additional embodiments correspond to systems and related computer programs that carry out the above-described methods. FIG. 21 shows a schematic representation of an apparatus 2100, in accordance with an example embodiment for optimizing a database query. In this case, the apparatus 2100 includes at least one computer system as in FIG. 22) to perform software and hardware operations for modules that carry out aspects of the method 2000 of FIG. 20.

In accordance with an example embodiment, the apparatus 2100 includes a query-access module 2102, a tree-determination module 2104, a selectivity-identification module 2106, a node-replacement module 2108, and a query-determination module 2110. The query-access module 2102 accesses a first database query, the first database query including selection operations directed to one or more tables in a database. The tree-determination module 2104 determines a first hierarchical tree that corresponds to the first database query, the first hierarchical tree including at least one source node for each of the one or more tables in the first database query.

The selectivity-identification module 2106 identifies a source node of the first hierarchal tree as highly selective if a selectivity condition is satisfied by a corresponding table for the source node or as not highly selective if the selectivity condition is not satisfied by the corresponding table for the source node, the selectivity condition corresponding to a limit on a number of rows accessed in the corresponding table. The node-replacement module 2108 determines a second hierarchical tree from the first hierarchal tree by replacing the source node with a sub-tree that corresponds to a filtered selection of the corresponding table from a larger table in the database, the sub-tree including an intermediate table that characterizes the filtered selection from the larger table if the source node is identified as not highly selective, and the sub-tree not including an intermediate table that characterizes the filtered selection from the larger table if the corresponding source node is identified as highly selective.

The query-determination module 2110 determines a second database query that corresponds to the second hierarchical tree. Additional operations related to the method 2000 may be performed by additional corresponding modules or through modifications of the above-described modules.

Figure 22:
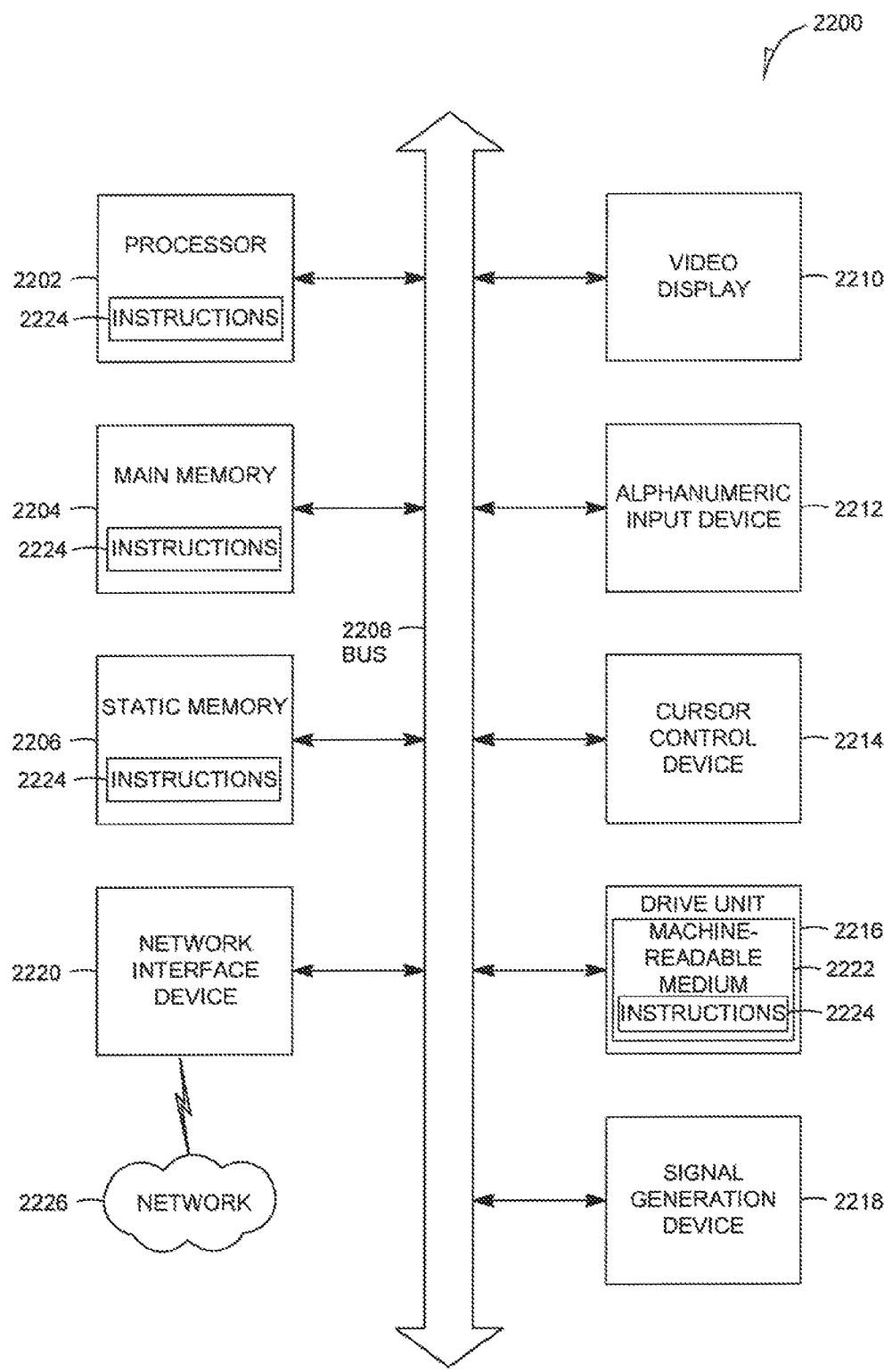
FIG. 22 is a block diagram that shows a computer processing system within which a set of instructions for causing the computer to perform any one of the methodologies discussed herein may be executed.

FIG. 22 shows a machine in the example form of as computer system 2200 within which instructions for causing the machine to perform any one or more of the methodologies discussed here may be executed. In alternative embodiments, the machine operates as a standalone device or may be connected (e.g., networked) to other machines, in a networked deployment, the machine may operate in the capacity of is server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 2200 includes a processor 2202 (e.g., a central processing unit (CPU), a graphics processing unit (CPU) or both), a main memory 2204, and a static memory 2206, which communicate with each other via a bus 2208. The computer system 2200 may further include a video display unit 2210 (e.g., a liquid crystal display (LCD) or a cathode ray tube (CRT)). The computer system 2200 also includes an alphanumeric, input device 2212 (e.g., a keyboard), a user interface (UI) cursor control device 2214 (e.g., a mouse), a disk drive unit 2216, a signal generation device 2218 (e.g., a speaker), and a network interface device 2220.

In some contexts, a computer-readable medium may be described as machine-readable medium. The disk drive unit 2216 includes a machine-readable medium 2222 on which is stored one or more sets of data structures and instructions 2224 (e.g., software) embodying or utilizing any one or more of the methodologies or functions described herein. The instructions 2224 may also reside, completely or at least partially, within the static memory 2206, within the main memory 2204, or within the processor 2202 during execution thereof by the computer system 2200, with the static memory 2206, the main memory 2204, and the processor 2202 also constituting machine-readable media.

While the machine-readable medium 2222 is shown in an example embodiment to be a single medium, the terms "machine-readable medium" and "computer-readable medium" may each refer to a single medium or multiple media (e.g., a centralized or distributed database, and/or associated caches and servers) that store the one or more sets of data structures and instructions 2224. These terms shall also be taken to include any tangible or non-transitory medium that is capable of storing, encoding or carrying instructions for execution by the machine and that cause the machine to perform any one or more of the methodologies disclosed herein, or that is capable of storing, encoding or carrying data structures utilized by or associated with such instructions. These terms shall accordingly be taken to include, but not be limited to, solid-state memories, optical media, and magnetic media. Specific examples of machine-readable or computer-readable media include non-volatile, memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; compact disc read-only memory (CD-ROM) and digital versatile disc read-only memory (DVD-ROM).

The instructions 2224 may further be transmitted or received over a communications network 2226 using a transmission medium. The instructions may be transmitted using the network interface device 2220 and any one of a number of well-known transfer protocols (e.g., hypertext transfer protocol (HTTP)). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Certain embodiments are described herein as including logic or a number of components, modules, or mechanisms. Modules may constitute either software modules or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module (e.g., a computer-implemented module) may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic, or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" (e.g., a "computer-implemented module") should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules, in embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation and store the output of that operation in a memory device to which it is communicatively coupled. A further hardware-implemented module may then, at a later time, access the memory device to retrieve and process the stored output. Hardware-implemented modules may also initiate communications with input or output devices and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SasS). For example, at least some of the operations may be performed by a group of computers (as examples of machines including processors), these operations being accessible via a network (e.g., the Internet) and via one or more appropriate interfaces (e.g., application program interfaces (APIs)).

Although only certain embodiments have been described in detail above, those skilled in the art will readily appreciate that many modifications are possible without materially departing from the novel teachings of this disclosure. For example, aspects of embodiments disclosed above can be combined in other combinations to form additional embodiments. Accordingly, all such modifications are intended to be included within the scope of this disclosure.

What is claimed is:

1. A method of optimizing a database query, the method comprising:
    accessing a first database query, the first database query including selection operations directed to one or more tables in a database; determining a first hierarchical tree that corresponds to the first database query, the first hierarchical tree including at least one source node for each of the one or more tables in the first database query; identifying a source node of the first hierarchal tree as highly selective if a selectivity condition is satisfied by a corresponding table for the source node or as not highly selective if the selectivity condition is not satisfied by the corresponding table for the source node, the selectivity condition corresponding to a limit on a number of rows accessed in the corresponding table; determining a filtered selection of the corresponding table from a larger table in the database by selecting one or more values of a data-access key that identifies rows of the larger table based on an access condition that restricts access to values of the larger table; determining a second hierarchical tree from the first hierarchal tree by replacing the source node with a sub-tree that corresponds to the filtered selection of the corresponding table from the larger table in the database, the sub-tree including an intermediate table that characterizes the filtered selection from the larger table if the source node is identified as not highly selective, and the sub-tree not including an intermediate table that characterizes the filtered selection from the larger table if the corresponding source node is identified as highly selective;
    determining a second database query that corresponds to the second hierarchical tree; and
    providing the second database query to the database for execution.

2. The method of claim 1, wherein the first hierarchical tree further includes selectivity nodes that correspond to selectivity operations directed to the one or more tables.

3. The method of claim 1, wherein the selectivity condition is satisfied if the number of rows accessed for the corresponding table is less than a threshold number of rows.

4. The method of claim 1, wherein the selectivity condition is satisfied if the corresponding table is accessed through an identifying key of the corresponding table in combination with another table that corresponds to a highly selective source node.

5. The method of claim 1, wherein the selectivity condition is satisfied if the corresponding table is accessed through an identifying key of the corresponding table in a join operation with another table that corresponds to a highly selective source node.

6. The method of claim 1, wherein the filtered selection of the corresponding table from the larger table implements an access control list that restricts access to the larger table based on a user identification associated with an execution of the second database query.

7. The method of claim 1, wherein the intermediate table includes a temporary table that is accessible locally or a temporary table that is accessible globally.

8. The method of claim 1, further comprising:
    performing an execution of the second database query in the database, the execution including a caching operation on the intermediate table if the source node is identified as not highly selective.

9. A non-transitory computer-readable medium that stores a computer program for optimizing a database query, the computer program including instructions that, when executed by at least one computer, cause the at least one computer to perform operations comprising:
    accessing a first database query, the first database query including selection operations directed to one or more tables in a database;
    determining a first hierarchical tree that corresponds to the first database query, the first hierarchical tree including at least one source node for each of the one or more tables in the first database query;
    identifying a source node of the first hierarchal tree as highly selective if a selectivity condition is satisfied by a corresponding table for the source node or as not highly selective if the selectivity condition is not satisfied by the corresponding table for the source node, the selectivity condition corresponding to a limit on a number of rows accessed in the corresponding table;
    determining a filtered selection of the corresponding table from a larger table in the database by selecting one or more values of a data-access key that identifies rows of the larger table based on an access condition that restricts access to values of the larger table;
    determining a second hierarchical tree from the first hierarchal tree by replacing the source node with a sub-tree that corresponds to the filtered selection of the corresponding table from the larger table in the database, the sub-tree including an intermediate table that characterizes the filtered selection from the larger table if the source node is identified as not highly selective, and the sub-tree not including an intermediate table that characterizes the filtered selection from the larger table if the corresponding source node is identified as highly selective;
    determining a second database query that corresponds to the second hierarchical tree; and
    providing the second database query to the database for execution.

10. The non-transitory computer-readable medium of claim 9, wherein the first hierarchical tree further includes selectivity nodes that correspond to selectivity operations directed to the one or more tables.

11. The non-transitory computer-readable medium of claim 9, wherein the selectivity condition is satisfied if the number of rows accessed for the corresponding table is less than a threshold number of rows.

12. The non-transitory computer-readable medium of claim 9, wherein the selectivity condition is satisfied if the corresponding table is accessed through an identifying key of the corresponding table in combination with another table that corresponds to a highly selective source node.

13. The non-transitory computer-readable medium of claim 9, wherein the selectivity condition is satisfied if the corresponding table is accessed through an identifying key of the corresponding table in a join operation with another table that corresponds to a highly selective source node.

14. The non-transitory computer-readable medium of claim 9, wherein the filtered selection of the corresponding table from the larger table implements an access control list that restricts access to the larger table based on a user identification associated with an execution of the second database query.

15. The non-transitory computer-readable medium of claim 9, wherein the intermediate table includes a temporary table that is accessible locally or a temporary table that is accessible globally.

16. The non-transitory computer-readable medium of claim 9, wherein the computer program further includes instructions that, when executed by the at least one computer, cause the at least one computer to perform operations comprising:
    performing an execution of the second database query in the database, the execution including a caching operation on the intermediate table if the source node is identified as not highly selective.

17. An apparatus configured to optimize a database query, the apparatus comprising at least one computer configured to perform operations for computer-implemented modules including:
    a query-access module that accesses a first database query, the first database query including selection operations directed to one or more tables in a database;
    a tree-determination module that determines a first hierarchical tree that corresponds to the first database query, the first hierarchical tree including at least one source node for each of the one or more tables in the first database query;
    a selectivity-identification module that identifies a source node of the first hierarchal tree as highly selective if a selectivity condition is satisfied by a corresponding table for the source node or as not highly selective if the selectivity condition is not satisfied by the corresponding table for the source node, the selectivity condition corresponding to a limit on a number of rows accessed in the corresponding table;
    a node-replacement module that determines a filtered selection of the corresponding table from a larger table in the database by selecting one or more values of a data-access key that identifies rows of the larger table based on an access condition that restricts access to values of the larger table, and further determines a second hierarchical tree from the first hierarchal tree by replacing the source node with a sub-tree that corresponds to the filtered selection of the corresponding table from the larger table in the database, the sub-tree including an intermediate table that characterizes the filtered selection from the larger table if the source node is identified as not highly selective, and the sub-tree not including an intermediate table that characterizes the filtered selection from the larger table if the corresponding source node is identified as highly selective; a query-determination module that determines a second database query that corresponds to the second hierarchical tree and that provides the second database query to the database for execution.

18. The apparatus of claim 17, wherein the first hierarchical tree further includes selectivity nodes that correspond to selectivity operations directed to the one or more tables.

19. The apparatus of claim 17, wherein the selectivity condition is satisfied if the number of rows accessed for the corresponding table is less than a threshold number of rows.

20. The apparatus of claim 17, wherein the selectivity condition is satisfied if the corresponding table is accessed through an identifying key of the corresponding table in combination with another table that corresponds to a highly selective source node.

21. The apparatus of claim 17, wherein the selectivity condition is satisfied if the corresponding table is accessed through an identifying key of the corresponding table in a join operation with another table that corresponds to a highly selective source node.

22. The apparatus of claim 17, wherein the filtered selection of the corresponding table from the larger table implements an access control list that restricts access to the larger table based on a user identification associated with an execution of the second database query.

23. The apparatus of claim 17, wherein the intermediate table includes a temporary table that is accessible locally or a temporary table that is accessible globally.

24. The apparatus of claim 17, wherein the computer-implemented modules further include:
    a query-execution module that performs an execution of the second database query in the database, the execution including a caching operation on the intermediate table if the source node is identified as not highly selective.

* * * * *